Oct. 20, 1959  J. T. SMITH  2,909,207
NON SKID TIRE SET
Filed Aug. 12, 1958  2 Sheets-Sheet 1
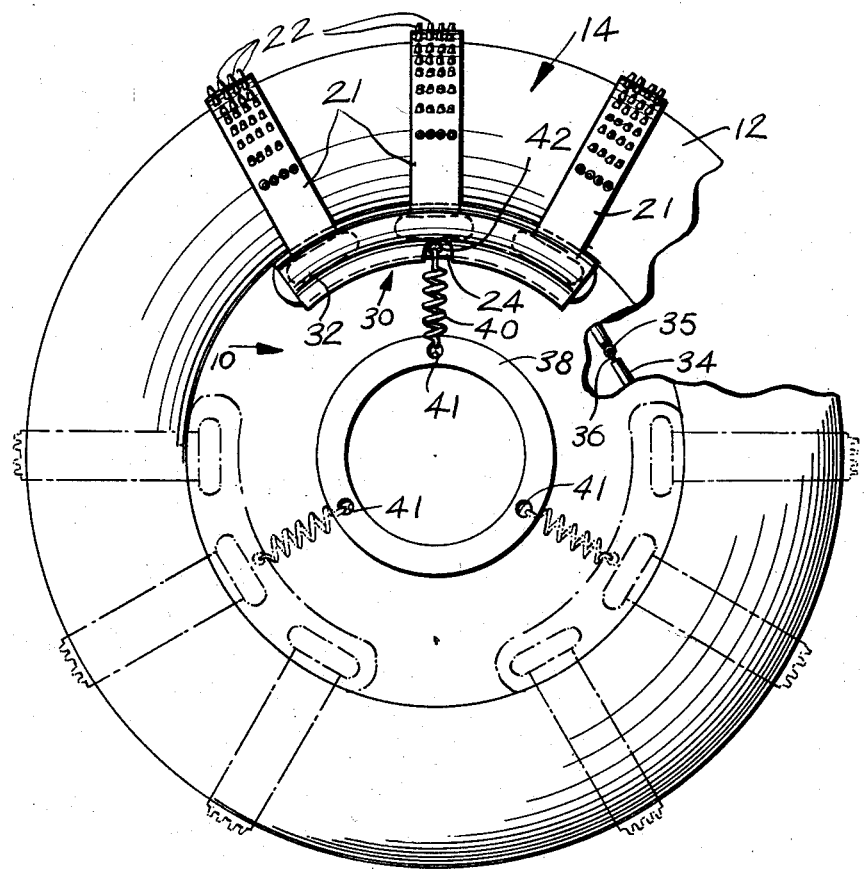
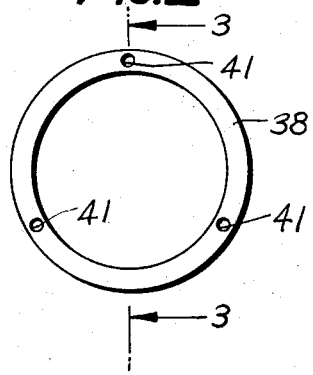
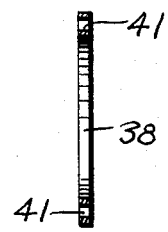
INVENTOR.
JOHN T. SMITH Oct. 20, 1959     J. T. SMITH     2,909,207
NON SKID TIRE SET Filed Aug. 12, 1958     2 Sheets-Sheet 2

INVENTOR.
JOHN T. SMITH

United States Patent Office 2,909,207
Patented Oct. 20, 1959

2,909,207

NON SKID TIRE SET

John T. Smith, Scranton, Pa.

Application August 12, 1958, Serial No. 754,674

5 Claims. (Cl. 152—222)

This invention relates to automotive vehicles and more particularly to an accessory therefor.

It is an object of the present invention to provide efficient as well as convenient means for converting conventional vehicle tires into non skid tires for increased traction during inclement weather.

Another object of the present invention is to provide a non skid tire set having a plurality of substantially identical elements that may be readily and easily replaced as they become worn, so as to prolong the useful life and effectiveness of the assembly.

Still a further object of the present invention is to provide a non skid tire set of the above type that can be readily applied to any automatic vehicle without jacking the vehicle up and without the use of special tools or equipment.

Other objects of the invention are to provide a non skid tire set bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

Figure 1 is a front elevational view of a preferred embodiment of the present invention, partly in section, and with parts removed to show details of construction;

Figure 2 is a front elevational view of a hub ring forming a part of the present invention;

Figure 3 is a transverse cross sectional view taken along line 3—3 of Figure 2;

Figure 4:
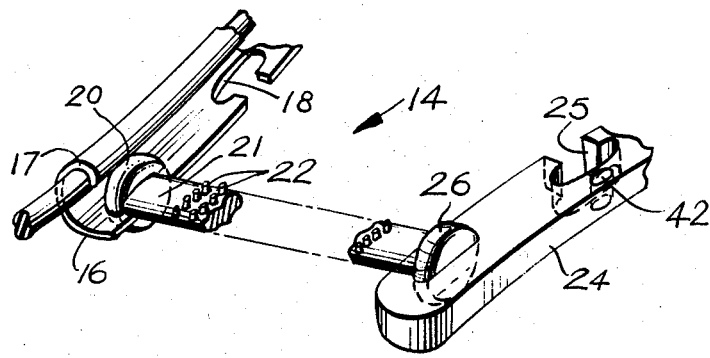
Figure 4 is a fragmentary perspective view of certain parts of the present invention.
Figure 5:
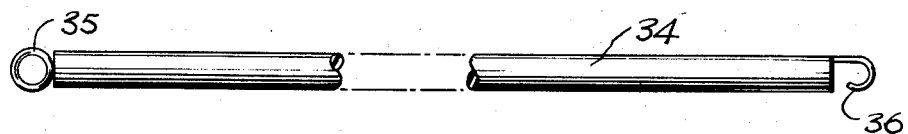
Figure 5 is a front elevational view of an elastic flexible cable forming another part of the present invention.

Referring now more in detail to the drawing, a non skid tire assembly 10 made in accordance with the present invention is shown in operative association with a conventional vehicle tire 12. This assembly 10 includes three identical sets 14 of lug straps which may be readily secured to the tire as a unit in a manner hereinafter more fully explained.

Each set 14 of lug straps includes a cable plate 16 having an arcuate tubular sleeve portion 17 that slidably receives an elastic and flexible cable 34 longitudinally therethrough. The opposite side of the cable plate 16 has cut outs defining a plurality of spaced apart sockets 18, each of which removably receives the head 20 at one end of a lug strap 21. Each such lug strap 21 has four longitudinal rows of truncated conical lugs 22 which serve to grip the roadway to increase traction of the vehicle when power is applied to the vehicle wheels.

Figure 6:
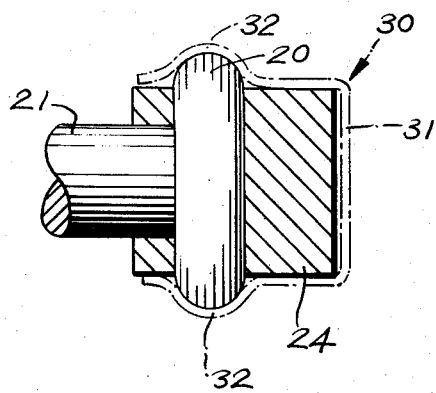
Figure 6 is a transverse cross sectional view of a ring plate, strap end, and retaining device forming still additional parts of the present invention.

Each such set 14 of lug straps also includes a ring plate 24 having a plurality of spaced apart cut outs defining sockets 25, each of which removably receives the head 26 at the opposite end of each lug strap 21. In both the cable plate 16 and ring plate 24, a retaining clip plate 30 is used to maintain the heads 20, 26 of the lug straps 21 in proper assembled relationship with the respective sockets 18, 25. As is more clearly shown in Figure 6 of the drawing, each retaining clip plate 30 includes a base 31 and a pair of spaced apart and substantially parallel spring like side arms 32. The arcuate portions of the side arms 32 engage the exposed arcuate portions of the lug strap heads 20, 26, as is more clearly shown in Figures 1 and 6 of the drawing, to maintain them in assembled relationship with the respective cable and ring plate sockets. These clip plates 30 are, however, removable in order to facilitate the replacement of one strap 21 during use.

The elastic cable 34 has a loop 35 at one end and a hook member 36 at the opposite end to enable the cable to be formed into a ring and disposed upon one side of the tire 14. A hub ring 38 having circumferentially spaced apart holes 41 is centered between the several ring plates 24 of the lug strap sets 14 by means of springs 40 which are engaged at one end within the holes 41 and at the opposite ends within similar holes 42 in each ring plate 24.

In actual use, the elastic cable 34 is inserted into the tubular sleeve portions 17 of the cable plates 16 of each lug set 14 and formed into a complete loop. The opposite ends of the lug sets are then drawn across the face of the tire and connected to the ring 38 by means of the springs 40. By connecting one lug strap set 14 at a time, it is thus possible to install the entire assembly 10 without raising the vehicle wheel above the ground and without the use of special tools or equipment. Whenever a lug strap becomes worn or breaks, it also is a simple matter to remove the retaining plates 30 and install the new strap in a simple and efficient manner.

While this invention has been described for use in connection with conventional tires 14, the assembly 10 may also be constructed for use with dual tires, such as those used by trucks and trailers, merely by lengthening the individual lug straps 21 so as to enable them to accommodate the full width of the multiple tires of each wheel.

While various changes may be made in the detail construction, it shall be understood that such changes shall be within the spirit and scope of the present invention as defined by the appended claims.

What I claim as new and desire to protect by Letters Patent of the United States is:

1. A non skid tire assembly comprising, in combination, a plurality of substantially identical sets of lug straps, a flexible cable yieldably connecting one end of all of said sets of lug straps together, a hub ring, and spring means yieldably connecting the opposite end of all of said sets of lug straps together, each said set of lug straps comprising an arcuate cable plate, an arcuate ring hub plate, a plurality of individual lug straps, and socket means releasably securing the opposite ends of said lug straps to said cable and ring plates, each end of said lug strap providing an enlarged head portion, and said socket means comprising individual cut outs in each of said cable and ring plates supportingly receiving said ends of said lug straps transversely therethrough.

2. The combination according to claim 1, further comprising lug strap head retaining clip plates releasably carried by each of said cable and ring plates overlying and retaining said strap heads within said cut outs.

3. The combination according to claim 2, wherein said flexible cable comprises a length of elastic cable having a loop at one end, and a hook at the opposite end for releasable engagement with said loop.

4. The combination according to claim 3, wherein each said cable plate includes a tubular portion slidably receiving said flexible cable therethrough.

5. The combination according to claim 4, wherein said spring means comprises a tension spring connected at opposite ends to said hub ring and to each of said ring plates.

References Cited in the file of this patent

UNITED STATES PATENTS

| | | |
|---|---|---|
| 1,585,336 | Feja | May 18, 1926 |
| 2,422,595 | Stevens | June 17, 1947 |
| 2,540,230 | Andrews | Feb. 6, 1951 |
| 2,687,760 | Gudalis | Aug. 31, 1954 |